US007099799B2

(12) United States Patent
Huard

(10) Patent No.: US 7,099,799 B2
(45) Date of Patent: Aug. 29, 2006

(54) COMPUTER PERFORMANCE ESTIMATION SYSTEM CONFIGURED TO TAKE EXPECTED EVENTS INTO CONSIDERATION

(75) Inventor: Jean-François Huard, Reston, VA (US)

(73) Assignee: Netuitive, Inc., Reston, VA (US)

(*) Notice: Subject to any disclaimer, the term of this patent is extended or adjusted under 35 U.S.C. 154(b) by 0 days.

(21) Appl. No.: 10/974,062

(22) Filed: Oct. 27, 2004

(65) Prior Publication Data
US 2005/0091005 A1 Apr. 28, 2005

Related U.S. Application Data

(60) Provisional application No. 60/514,701, filed on Oct. 27, 2003.

(51) Int. Cl.
G01F 15/00 (2006.01)
(52) U.S. Cl. .......................................... 702/186; 706/21
(58) Field of Classification Search ................ 702/186, 702/182–185, 188; 700/25; 703/2; 706/21
See application file for complete search history.

(56) References Cited

U.S. PATENT DOCUMENTS

| 5,239,594 | A | 8/1993 | Yoda | 382/158 |
|---|---|---|---|---|
| 5,444,819 | A | 8/1995 | Negishi | 706/21 |
| 5,461,699 | A | 10/1995 | Arbabi | 706/21 |
| 5,727,128 | A | 3/1998 | Morrison | 706/45 |
| 5,748,508 | A | 5/1998 | Baleanu | 703/13 |
| 5,748,851 | A | 5/1998 | Iokibe | 706/58 |
| 5,953,707 | A | 9/1999 | Huang | 705/10 |
| 6,182,022 | B1 | 1/2001 | Mayle | 702/182 |
| 6,205,431 | B1 | 3/2001 | Willemain | 705/10 |
| 6,208,953 | B1 | 3/2001 | Milek | 703/7 |
| 6,289,330 | B1* | 9/2001 | Jannarone | 706/26 |
| 6,792,399 | B1* | 9/2004 | Phillips et al. | 705/36 R |
| 6,928,398 | B1 | 8/2005 | Fang | 703/2 |
| 2001/0034637 | A1 | 10/2001 | Lin et al. | 705/10 |
| 2002/0049687 | A1* | 4/2002 | Helsper et al. | 705/45 |

(Continued)

FOREIGN PATENT DOCUMENTS

| EP | 89118487.1 | 10/1989 |
|---|---|---|
| EP | 92114059.6 | 8/1992 |
| WO | WO 98/22885 | 5/1998 |

OTHER PUBLICATIONS

LeBaron, Blake; Arthur, W. Brian, and Palmer, Richard. "Time series properties of an artificial stock market." Journal of Economic Dynamics & Control, Nov. 20, 1998.

(Continued)

Primary Examiner—Edward Raymond

(57) ABSTRACT

The present invention may be embodied as expected event scheduler and processor in an application performance monitoring (APM) services. The expected event scheduler and processor allows the APM system to take scheduled events into account when performing the performance forecasting for the host system. The learned parameters may be based on measured input values including internal measurements, such as data from monitoring agents located within the host computer system, as well as external measurements relating to factors such as computer backup runs, monthly payroll runs, quarterly financial reporting runs, weekends, holidays, weather data, traffic data, advertisements run by the operator of the system or others, promotional events, product releases, news announcements, elections and other natural and demographic factors. The expected events may overlap in time, and the expected event scheduler and processor learns weighing factors for the simultaneously occurring expected events by updating the learned parameters over successive time trials.

29 Claims, 6 Drawing Sheets

U.S. PATENT DOCUMENTS

2003/0036890 A1* 2/2003 Billet et al. .................... 703/2

OTHER PUBLICATIONS

You, Chun and Chandra, Kavitha. "Time Series Models for Internet Data Traffic." Local Computer Networks, 1999, pp. 164-171.

Wu, Shaun-inn and Lu, Ruey-Pyng. "Combining Artificial Neural Networks and Statistics for Stock-Market Forecasting." pp. 257-264.

Woodward 5009 Fault-tolerant Control—Product Specification 85578F.

* cited by examiner

COMPUTER PERFORMANCE ESTIMATION SYSTEM CONFIGURED TO TAKE EXPECTED EVENTS INTO CONSIDERATION

REFERENCED TO RELATED APPLICATIONS

This application claims priority to commonly-owned U.S. Provisional Patent Application Ser. No. 60/514,701 filed on Oct. 27, 2003, which is incorporated herein by reference. This application incorporates by reference the disclosures of the following commonly-owned patents and patent applications: U.S. Pat. No. 5,835,902; U.S. Pat. No. 6,216,119; U.S. Pat. No. 6,289,330; U.S. Pat. No. 6,876,988; (pending U.S. patent application Ser. No. 10/165,232, and (pending U.S. patent application Ser. No. 10/324,641).

TECHNICAL FIELD

This invention relates to a computerized estimation system and, more specifically, relates to a computerized estimation system that takes expected events into account in the estimation. In particular, the disclosed embodiment may be implemented as an computer performance estimation system providing application performance monitoring (APM) services that takes scheduled and seasonal events into account in the computer performance estimation.

BACKGROUND OF THE INVENTION

A variety of sophisticated systems have been developed for monitoring and forecasting performance in various fields. These monitoring and forecasting systems may be referred to, collectively or individually, as "estimation systems." For example, conventional statistics systems, artificial neural network systems, or concurrent learning and information processing (CLIP) systems capable of monitoring and forecasting a large number of variables have been developed for use in a variety of fields including computer performance monitoring and forecasting, visual image processing, electricity demand forecasting, and commodity price forecasting. These estimation systems typically use a number of measured input values to impute (i.e., estimate for a current time trial) current values for monitoring, and they may also predict (i.e., estimate for future time trials) future input values. In particular, these systems may compare imputed input values with actual input values to identify abnormal input values when they occur, and they may also predict or forecast the likelihood that future input values will become abnormal.

The mathematical core technology of these monitoring and forecasting systems may involve the computation of a matrix of estimation parameters, also called learned parameters. This matrix typically contains observed relationships, such as the covariances, between input and output variables. Estimation systems may also utilize the inverse of the covariance matrix, which is sometimes referred to as a "connection weight matrix." In particular, the elements of the covariance matrix are typically estimated through the application of statistical analysis to a historical database of input and output values. Once the covariance matrix has been computed, it may be inverted to obtain the connection weight matrix, which can be used to directly compute estimates for the output values from a given set of input values through standard matrix computations.

Moreover, once the covariance and connection weight matrices have been initially determined, they may be used to perform monitoring and forecasting on a CLIP basis. That is, a new set of computed output values may be computed for each time trial of measured input values, and for each time trial either the covariance matrix, the connection weight matrix, or both may be updated to achieve learning while the system performs its monitoring and prediction functions. See in particular U.S. Pat. No. 5,835,902.

In connection with using these types of estimation systems for time-based parameters, such as computer performance, expected events are typically superimposed on top of the "normal" system performance without these factors. For example, seasonal holiday events cause an expected deviation from the normal system performance. In addition, scheduled events such as payroll processing quarterly report processing, and system backup operations can also cause an expected deviation from the normal system performance.

Unfortunately, these expected events can cause false alarms in by the computer performance monitoring system. Given the type of events under consideration, staff technicians may often be off work, for example during holidays or scheduled processing performed outside of regular business hours. Such false alarms can therefore be most inconvenient. One approach to addressing this problem is to suspend the computer performance monitoring during these expected events. However, this practice runs the risk of missing a real system problem, which might be exacerbated by the absence of staff technicians.

Moreover, expected events can overlap in time, which can increase the likelihood of false alarms during these periods. Therefore, a continuing need exists for effective and efficient methods and systems for handling expected events, such as seasonal and scheduled events, in estimation systems. A particular need exists for these methods and systems for computer performance estimation systems.

SUMMARY OF THE INVENTION

The present invention meets the needs described above in a computerized estimation system that takes expected events into account in the estimation. In particular, the disclosed embodiment may be implemented as a computer performance estimation system providing application performance monitoring (APM) services that takes scheduled and seasonal events into account in the computer performance estimation. In an AMP system, for example, an expected event scheduler and processor takes expected events into account when monitoring and forecasting the performance of the host computer system. The learned parameters may be based on measured input values including internal measurements, such as data from monitoring agents located within the host computer system of the host computer system. The learned parameters may also be based on external measurements relating to factors such as computer backup runs, monthly payroll runs, quarterly financial reporting runs, weekends, holidays, weather data, traffic data, advertisements run by the operator of the system or others, other promotional activities or events, product releases, news announcements, elections and other natural and demographic factors. The expected events may overlap in time, and the expected event scheduler and processor learn weighing factor for the simultaneously occurring expected events through updating applied to the learned parameters over successive time trials.

In this manner, the invention improves the accuracy of the estimation system, typically a monitoring and forecasting system, and avoids false alarms attributable to expected events that can be, and should be, taken into account. In addition, the present event avoids such false alarms without suspending the computer performance monitoring during these expected events, which would disadvantageously run the risk of missing a real system problem. As noted above, this situation might be exacerbated by the absence of staff technicians in the absence of the present invention.

Generally described, the present invention may be embodied as an expected event scheduler and processor system in or for an estimation system for a host system operable for receiving input values for successive time trials, computing output values based on the input values and learned parameters, and updating the learned parameters to reflect relationships observed among the input and output values The method for implementing the expected event system includes identifying expected events and provisioning the estimation system with learned parameters for the expected events. The learned parameters for the expected events are then initialized, the estimation system is run during successive time trail to forecast operation of the host system as effected by the expected events while updating the learned parameters including the learned parameters for the expected events.

Running the estimation system includes receiving measured data corresponding to operation of the host system for a current time trial and estimating operation of the host system for the current time trial using imputed learned parameters. Running the estimation system also includes predicting operation of the host system for future time trial using forecasted learned parameters and updating the learned parameters based on the measured data received for the current time trial. The estimation system then repeating these steps for a number of successive time trials.

The expected events typically include scheduled events and seasonal events. The expected events may also include multiple overlapping expected events. In this case, the learned parameters include weighting factors for the overlapping expected event. In addition, the estimation system may monitor and forecast the performance of the computer system that includes a computer network including application servers, storage servers, routers, and interconnecting data transmission lines. For this type of estimation system, the expected events may include end-of-month processing events, end-of-quarter processing events, and scheduled backup events. The expected event may also include weekends and holidays.

The measured data typically includes internally-generated factor, such as data received from one or more monitoring agents deployed within the computer system. The measured data may also include data received from one or more sources external to the computer system.

In addition, the invention may be implemented as a method implemented by computer hardware, or as a computer storage medium storing executable instructions for causing a computer system to implement the method.

In view of the foregoing, it will be appreciated that the present invention greatly improves the operation of computer performance estimation systems in the presence of expected events, such as scheduled and seasonal events. The specific techniques and structures employed by the invention to improve over the drawbacks of prior estimation systems to accomplish the advantages described above will become apparent from the following detailed description of the embodiments of the invention and the appended drawings and claims.

DETAILED DESCRIPTION OF THE EMBODIMENTS

Figure 1:
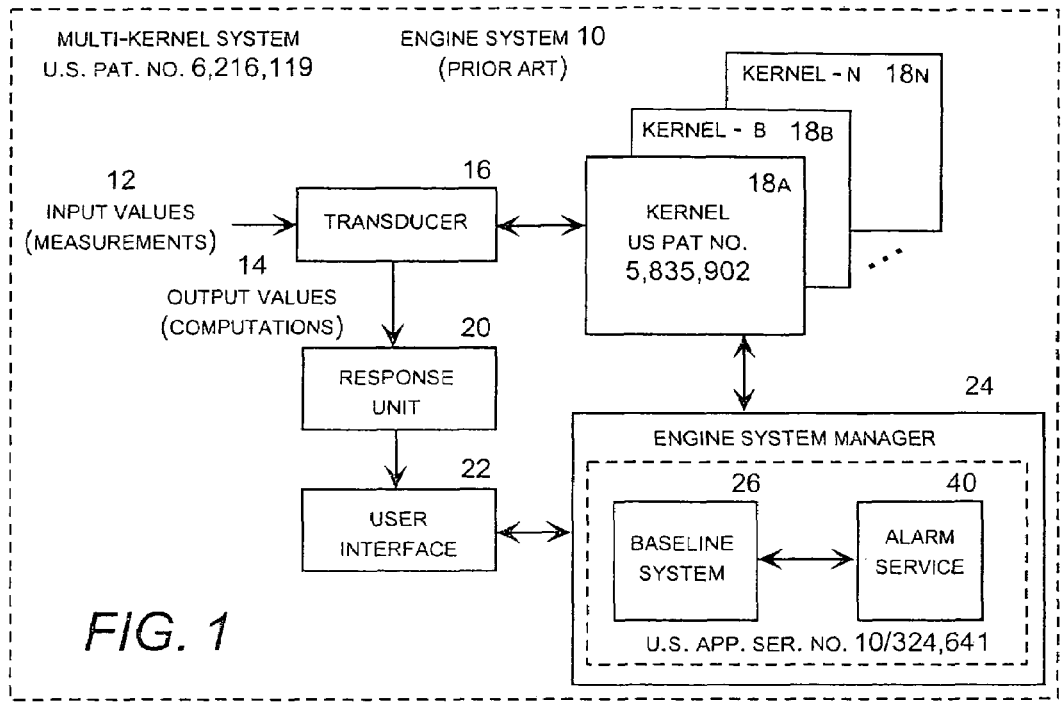
FIG. 1 is a block diagram of a multi-kernel concurrent learning and information processing (CLIP) system that supports the computer performance estimation system configured to take expected events into consideration of the present invention.

The present invention may be embodied as an expected event scheduler and processor in or for estimation systems generally and, in particular, computer performance estimation systems such as those performing application performance monitoring (APM) services. The expected event scheduler and processor allows the estimation system to take scheduled events into account when performing the estimation for the host system. In an AMP system, for example, expected event scheduler and processor takes expected events into account when monitoring and forecasting the performance of the host computer system. The learned parameters may be based on measured input values including internal measurements, such as data from monitoring agents located within the host computer system. The learned parameters may also be based on external measurements relating to factors such as computer backup runs, monthly payroll runs, quarterly financial reporting runs, weekends, holidays, weather data, traffic data, advertisements run by the operator of the system or others, other promotional activities or events, product releases, news announcements, elections and other natural and demographic factors. The expected events may overlap in time, and the expected event scheduler and processor learns weighing factors for the simultaneously occurring expected events through updating applied to the learned parameters over successive time trials.

In particular, the present invention may, but need not necessarily, be embodied in an estimation system that utilizes learned parameters including a matrix containing covariance values between input and output variables or the inverse of the covariance matrix, which is also called a connection weight matrix. In a concurrent learning and information processing (CLIP) system, the values of the connection weight matrix are typically determined through the application of correlation analysis to a historical database of input and output values. The learned parameters are then updated over successive time trials as the CLIP system also monitors and forecasts the output values selected for the host system.

More specifically, once the covariance and connection weight matrices have been initially determined, they may be used to perform monitoring and forecasting of a variety of system parameters on a real-time basis. That is, a new set of output values may be computed for each time trial of measured input values. In addition, the connection weight matrix may be updated for each time trial to implement learning while the system performs its monitoring and prediction functions. In an AMP system, for example, the CLIP system updates the learned parameters while monitoring and forecasting the performance of the host computer system over successive time trials. The updating of the connection weight matrix can be performed in two ways. First, the covariance matrix may be updated for each time trial and then inverted. Second, the inverted covariance matrix may be updated directly. The basic single-kernel CLIP system and a number of its applications are described in commonly-owned U.S. Pat. No. 5,835,902. A multi multi-kernel CLIP system and a number of its applications are described in U.S. Pat. Nos. 6,216,119 and 6,289,330.

FIG. 1 is a functional block diagram of a multi-kernel CLIP monitoring and forecasting engine system 10 that has been augmented to take multiple expected events into consideration when monitoring and forecasting its objective parameters, such as those used to monitoring and forecast the performance of a computer system. As noted above, the engine system 10 may comprise one or more kernel units 18, each of which may operate according to its own configuration parameters.

U.S. patent application Ser. No. 10/165,232 describes refinement operations for the engine system 10 including continual evaluation of a set of competing statistical models based on differing configuration parameters, through which the kernel units 18 may operate simultaneously and competitively on-line, with output being tied to only one of them. For example, the recent performance of several kernels monitoring and forecasting the objective parameters for the host system may be compared off-line by the manager 24, and the best performing kernel unit 18 is then selected for use until the next time the performance of the several kernels is compared off-line. The engine system 10 may implement these refinement operations, as governed by the engine system manager 24, in two distinct modes, an on-line mode and an off-line mode.

In the on-line mode, the engine system 10 produces estimates and updates learned system parameters continually over consecutive time trails based on a fixed set of configuration parameters 10. By contrast, in the off-line mode the estimation system operates so as to change the configuration parameters 10 without either producing estimates or updating learned parameters. Moreover, in the on-line mode the estimation system 10 operates quickly and for the most part recursively to produce estimates and update learning during each time trial. By contrast, in the off-line mode the engine system 10 typically performs refinement operations relatively slowly and for the most part iteratively, through operations that either interrupt on-line operations or operate separately but at the same time. In both modes, however, the engine system typically operates automatically. In the off-line mode, the engine system 10 performs refinement operations as governed by the manager 24. Refinement operations first assess the quality of the current configuration parameters, after which they modify the configuration parameters, as appropriate.

This patent application also describes a semi-automated analysis process that functions to refine the kernels in a way that allows analysts to analyze historical datasets in order to determine a desired set of configuration parameters for those datasets. As part of this semi-automated process, the refinement processor may implement refinement operations including removing redundant measurement features, removing unnecessary measurement features, identifying optimal learning weights, and identifying beneficial uses of recent trends. As noted above, this application further specifies a fully automated analyzer that, unlike its semi-automated counterpart, requires neither historical data nor manual operation. Instead, the fully automated analyzer routinely compares competing models, identifies the model that performs best according to selected criteria, and replaces the currently operating model with the best performing model in accordance with a selected schedule in fully automatic fashion.

The engine system 10 typically operates in the on-line mode by receiving input values 12 via the transducer 16 at the beginning of every fifteen minute time trial. Next, during the same fifteen minute time trial, the engine system 10 performs two additional operations, delivering output values 14 via the transducer 16 and updating learned parameter values associated with one or more kernel units 18. Taken together, kernel units 18 specifications and transducer 16 specifications constitute definitions of one or more estimation models that the engine system 10 utilizes during on-line operation. The engine system 10 may also occasionally receive, via the kernel units 18, a set of updated configuration parameters 26, which may in turn signal the need of modifications in the operation of the kernel units 18 and the transducer 16, in which case the manager 24 may initiate off-line refinement operations as described above. In particular, these refinement operations typically modify the configuration parameters 26 in such a way that the kernel units 18 will correct for input values 12 and transducer 16 values that are linearly redundant or otherwise ineffective as monitoring or forecasting parameters.

In addition, the engine system 10 may operate as a dynamically linked library (DLL), which is linked to an executable computer program (EXE) via an application-program interface (API). In terms of the labeled components in FIG. 1, during on-line operation the input values 12 are sent by the EXE to the engine system 10 via the API, and output values 14 are sent back to the EXE by the engine system 10 via the API. During engine system 10 initialization, the EXE also supplies initial configuration parameters via the API. After initialization, some of these initial configuration parameters may change as part of the automatic estimation system refinement process, while others may not.

U.S. application Ser. No. 09/811,163 describes a CLIP-based computer system performance estimation system 30 (also referred to as an application performance monitoring or "APM" system). In this APM system, the learned parameters may be based on measured input values including internally-generated measurements, such as data from monitoring agents located within the host computer system. The learned parameters may be based on measured input values including external measurements relating to factors such as weather data, traffic data, advertisements run by the operator of the system or others, other promotional activities or events, product releases, news announcements, elections and other natural and demographic factors. In fact, the basic CLIP-based APM system can learn correlations that may exist between the behavior of the host computer system based on any parameter for which data can be gathered.

Those measured parameters that are effective in predicting the behavior of the host computer system (i.e., have a significant non-zero correlation over time) are retained as predictive parameters and those that do not are eliminated from the model.

U.S. application Ser. No. 10/324,641 describes improvements to the APM system 30 including a baseline system 26 and an alarm service 40 for computer networks and server systems exhibiting erratic motions that contain repeating characteristics, such as global trends, cyclical variations, and seasonal variations. The baseline model 26 learns these behaviors by capturing the signatures of input variables measured for the monitored system and adapting the signatures over time, improving their accuracy, and automatically learning changes in behavior as they occur. Because the baseline model 26 captures the signatures based on an analysis of received data over successive time trials, it bypasses the typical modeling stage of the commonly used methods of analysis. That is, the baseline system 26 captures and continually updates the monitored system's signatures, and uses these captured signatures to model the system, rather than relying on deterministic curve fitting or other classical types of data analysis, such as time series analysis and statistical analysis.

Figure 2:
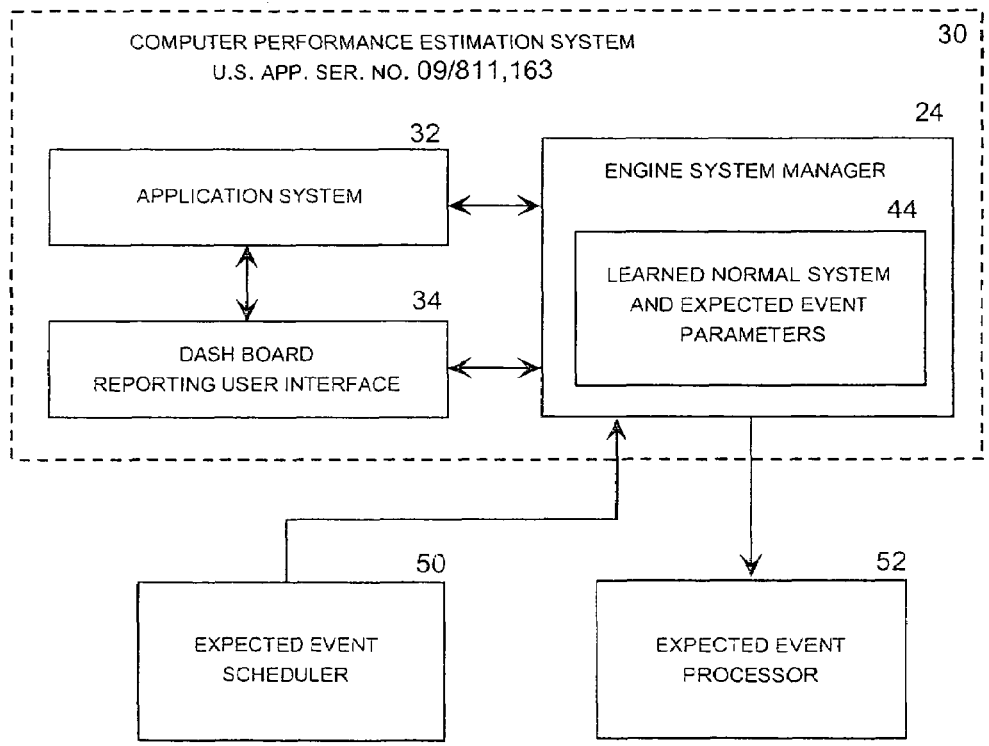
FIG. 2 is a block diagram of a computer performance estimation system implemented within the CLIP system of FIG. 1.

FIGS. 1 and 2 illustrate how the expected event scheduler 50 and the expected event processor 52 of the present invention tie into the engine system 10 and the computer performance estimation system 30 described above. The expected event scheduler 50 allows the user to specify expected seasonal and scheduled events, such as computer backup runs, monthly payroll runs, quarterly financial reporting runs, weekends, holidays and so forth. Internal and external measured data correlating with the computer performance during these events is included in the input values 12 shown in FIG. 1. As noted previously, learned parameters may be based on measured input values 12 including internally-generated measurements, such as data from monitoring agents located within the host computer system. The learned parameters may also or alternatively be based on measured input values including external measurements, such as weather data, traffic data, advertisements run by the operator of the data from monitoring agents located within the host computer system, promotional activities, product releases, news announcements, elections and other natural and demographic factors. These input values are also used to learn parameters for normal computer system operation. But some input values may be included because they are correlated with normal computer system operation, while other input values may be included because they are correlated with computer system operation during expected events.

In any of these configurations, the engine system 10 is first provisioned for expected event consideration by configuring the kernel 18 and possibly the input transducer 16 with learned parameters for these events including weighting factors for expected events scheduled to overlap in time. The expected event scheduler 50 is then configured with the schedules (i.e., the time periods when occurring) for the expected events. The engine system 10 is then run for successive time trials to compute predicted computer system behavior during normal periods and during expected events, which may overlap in time. The functionality for handling this situation is described in more detail below with reference to the expected event processor 52.

Figure 3:
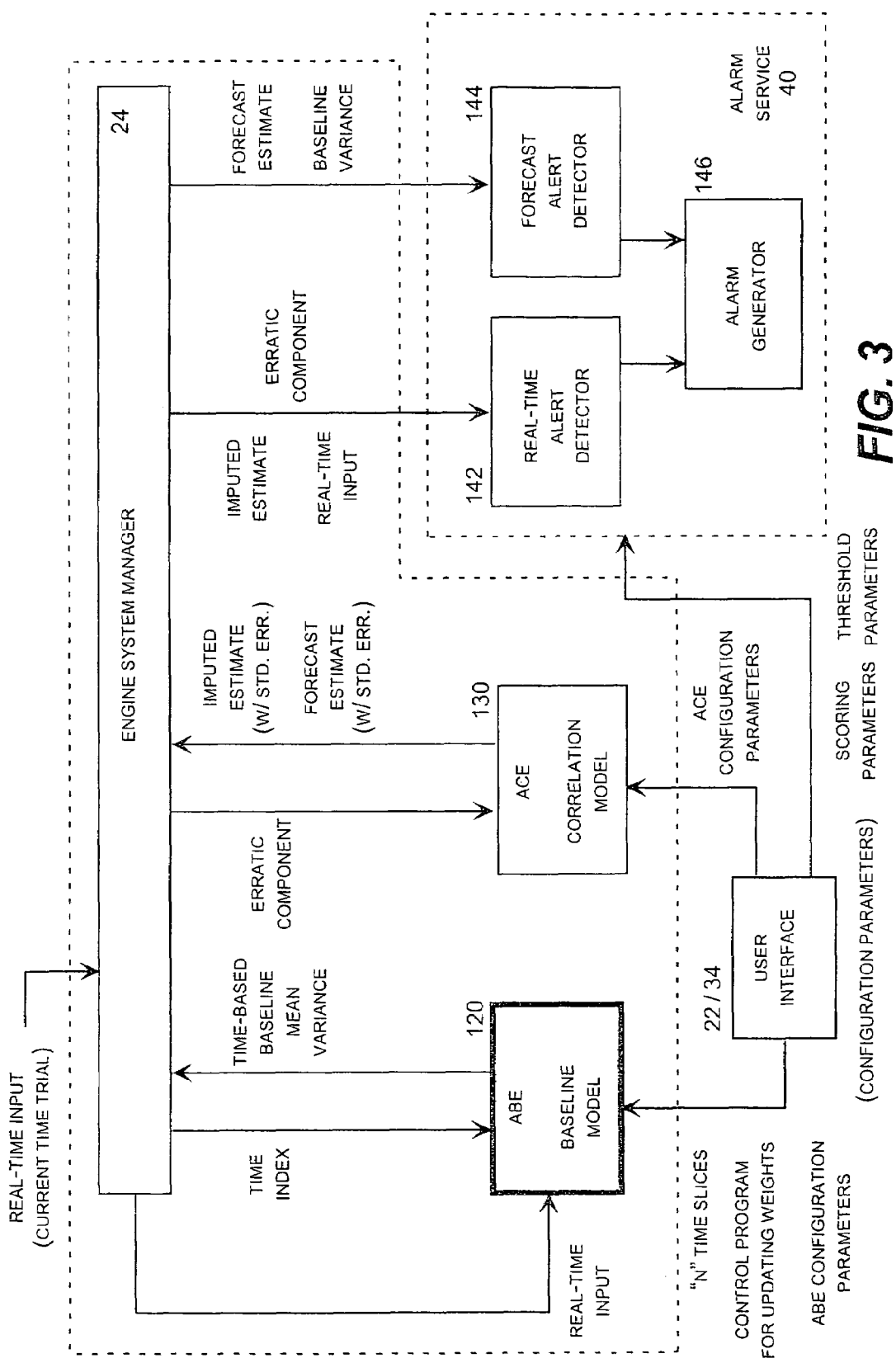
FIG. 3 is a block diagram of a baseline system implemented within the computer performance estimation system of FIG. 4.

Referring to FIG. 3, the baseline system 26 typically includes an adaptive baseline model (ABE) 120 and an adaptive correlation engine (ACE) 130. The ABE and the ACE interface with the alarm service 40, which typically includes a real-time alert detector 142, a forecast alert detector 144, and an alarm generator 146. The ABE 120 and the ACE 130 (which consists of the transducer 16 and the multi-kernels 18*a*–*n* in FIG. 1) also work in conjunction with the engine system manager 24, which functions as a coordinator for the other system elements and manages the overall system activity during the running operation of the engine system 10. Although these components are typically deployed as separate computer objects, they may be further subdivided or combined with each other or other objects in any manner suitable for a particular application. In addition, any of the components may be deployed locally or remotely, and may be combined with other functions and services.

During the running operation of the engine system 10, the ABE 120 receives a set of measurements defining input variables for each time trial in a continually recurring set of time trials, which is represented by the input variable Y(t). Although the input variables typically include a vector containing multiple measurements, each input variable may be handled in the same manner. Therefore, for descriptive convenience, the methodology of the monitoring system is described for the representative input variable Y(t), which is also referred to as the "subject input variable," to distinguish it from the other input variables. However, it should be understood that this same methodology applies to all of the input variables in a multi-variable vector represented by Y(t).

That is, each input of several input variables is treated as the "subject input variable" for its own processing, and all of these input variables are processed for each time trial, typically simultaneously, although they could be processed sequentially in some order. For this reason, the methodology is described below as applicable to a single "subject input variable" Y(t), and it is to be understood that multiple input variables are typically processed in a similar manner, either simultaneously or in some order. In addition, the ABE 120 may also receive additional input variables that are not processed as signatures, such as status indicators and configuration parameters. However, these variables may be ignored for the purpose of describing the inventive aspects of the expected event scheduler 50 and processor 52.

The operation of the ABE 120 is typically repeated for each time trial in a continual time series of time trials. In general, the ABE 120 continually receives measurement for the representative input variable Y(t), to define a time-based signature of measured values for that variable. In this time-based series, the time units are referred to as the "time index," which typically begins with time index "t=1" and sequentially run through "n" successive time trials for a repeating cycle. To permit estimation of the performance of the host computer system, the ABE 120 maintains a time-based baseline model for the representative input variable Y(t). More specifically, the ABE 120 defines a repeating cycle for the input variable Y(t) and computes a time-based mean and variance for each time period or "time slice" of the cycle. In other words, the ABE 120 defines a time-based baseline model for the input variable Y(t) that includes a time-based baseline mean and variance for each time index in the cycle. The cycle is typically defined by a user input parameter specifying a number of time slices "n" in the cycle. This parameter together with the inherent frequency of the input variable Y(t) defines a repeating cycle, which is typically the same for all of the input variables.

Further, the time-based baseline model for the input variable Y(t) is typically composed from a number of components, which the ABE 120 tracks individually. In particular, the signature for the input variable Y(t) may typically be decomposed into a global trend component G(t), a cyclical component C(t), a seasonal or scheduled component S(t), and an erratic component e(t), as reflected in a decomposition equation [i.e., Y(t)=G(t)+C(t)+S(t)+e(t)]. Nevertheless, it should be understood that these particular components are merely illustrative, and that the ABE 120 may track additional components, different components, only a subset of these components, as may be appropriate for a particular application. However, the illustrated set of components included in the decomposition equation described above have been found to be well suited to a monitoring system for a complex computer network or server system.

Figure 4:
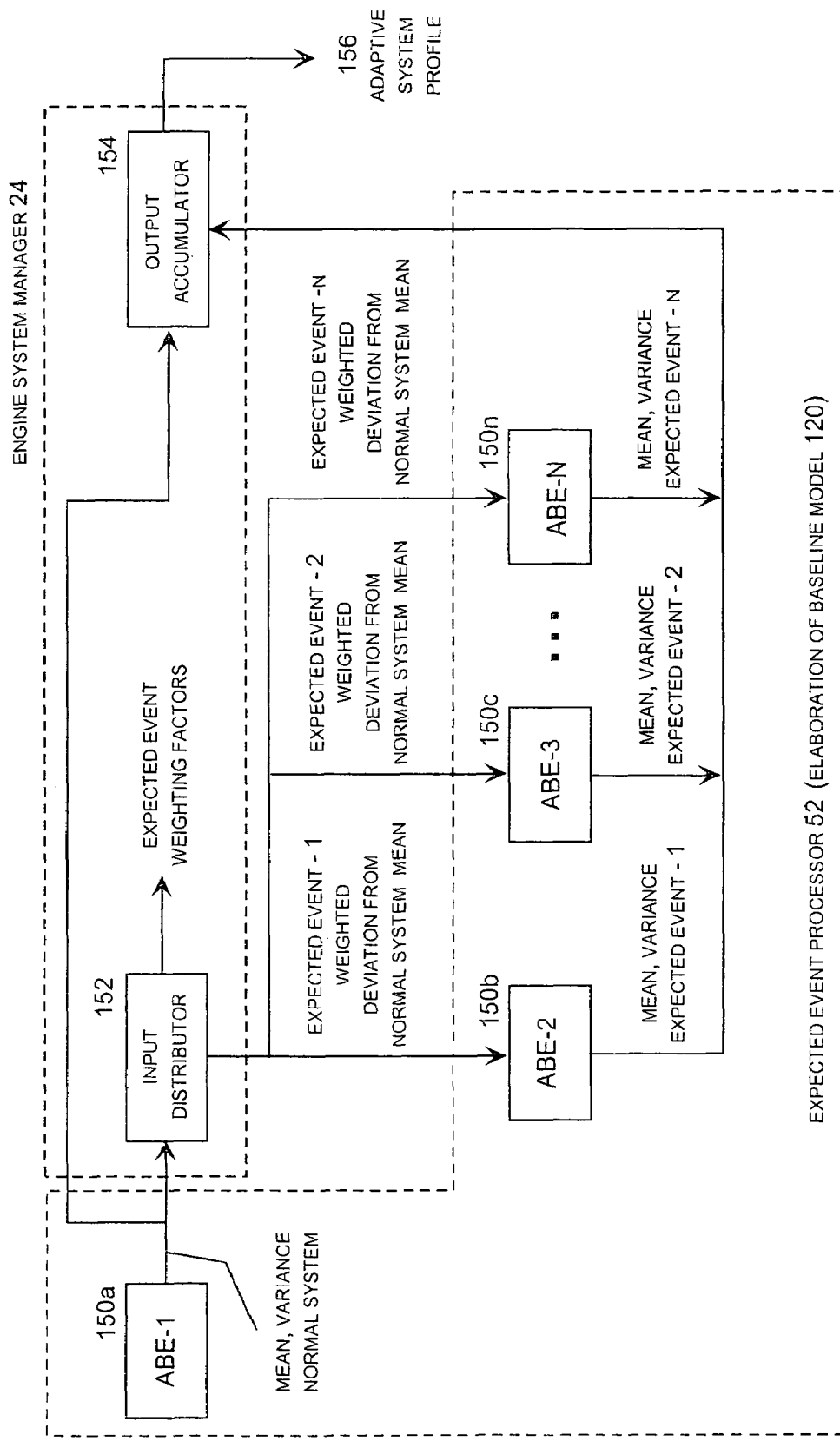
FIG. 4 is a block diagram of baseline system of FIG. 3 configured to take expected events into account.

Referring to FIG. 4, the expected event processor 52 may be implemented as an elaboration of the baseline system 26 shown on FIGS. 1 and 4. Even more specifically, the expected event processor 52 may be implemented as an elaboration of the baseline model or ABE 120 shown in FIG. 3 utilizing several simultaneous instantiations of the ABE, which are identified as ABE 150a–n on FIG. 4. The expected event processor 52 provides a method and system for computing the value seasonal or scheduled component S(t) in the baseline composition equation [i.e., Y(t)=G(t)+C(t)+S(t)+e(t)] while taking expected events that may overlap in time into account in the manner described below.

The ABE-1 150a receives the input variables for each time trial and computes the expected means and variances of the learned parameters for normal system operation, as described in U.S. application Ser. No. 10/324,641. The input values, means and variances of the learned parameters for normal system operation are then passed to an input distributor 152 that computes, and learns through successive time trials, weighting factors for multiple expected events for each time trail. The input distributor 152 also computes the deviation of the measured input values and the expected means for these input values during normal system operation, as computed by the ABE-1 150a. The input distributor 152 then weights each deviation by its associated weighting factor. Each weighted deviation is then passed to an associated instantiation of the ABE 150b–n as shown on FIG. 4.

The computation of the weight for a given ABE 150i at the given time trial is typically achieved by taking the ratio of the variance computed by the given ABE 150i at the given time trial to the sum of the variance of all overlapping expected events ABE 150a–n at the given time trial.

Each individual ABE instantiation then computes the mean and variance for its associated expected event. That is, the ABE 150b computes the mean and variance for the first expected event-1, the ABE 150c computes the mean and variance for the second expected event-2, and so forth up to the ABE 150n, which computes the mean and variance for the "Nth" expected event-N. The means and variances for the expected events are then passed to an output accumulator 154, which sums the expected event means and variances with the normal system mean and variance to produce the complete adaptive system profile 156.

Figure 5:
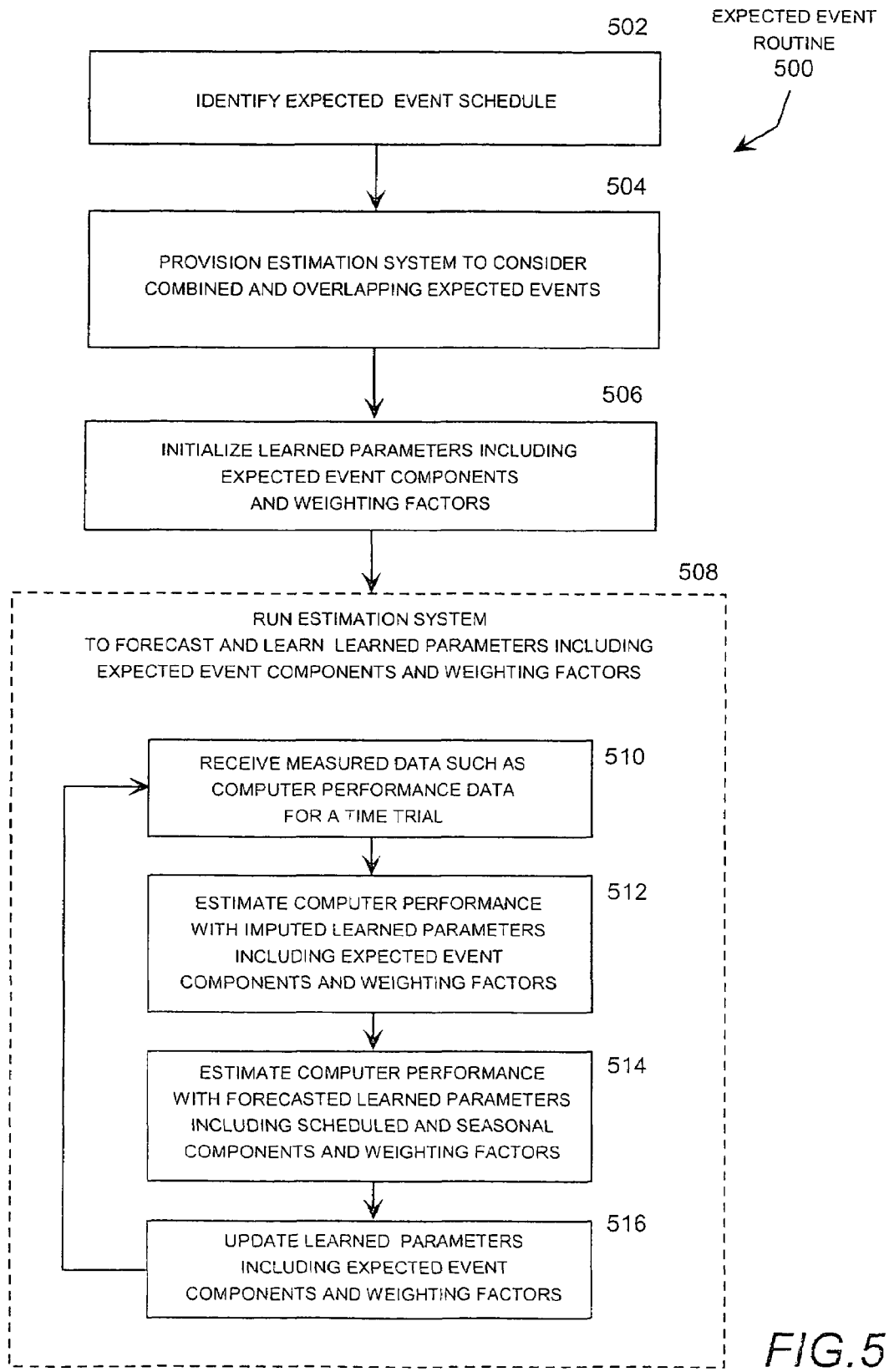
FIG. 5 is a logic flow diagram illustrating a routine for operating an expected event processor.

FIG. 5 is a logic flow diagram illustrating a routine for operating the expected event scheduler 50 and the expected event processor 52. In step 502, the a technician configuring the engine system 10 identifies expected events and provisions the expected event schedule 50 with the time periods during which one or more expected events are scheduled. Step 502 is followed by step 504, in which the engine system 10 including the kernel 18, possibly the input transducer 16, and the expected event processor 52 are provisioned to consider the expected events during the estimation of the host system operation. Specifically, the kernel 18 is provisioned with learned parameters for the expected event weighting factors and any additional input variables that are defined in association with the expected event processor. The input transducer 16 may be configured to weigh, combine or otherwise manipulate the raw input variables 12 into process variables for the kernel 18. In addition, the expected event processor 52 is implemented including the input distributor 152, the output accumulator 154, and the capability to deploy multiple instantiations of the ABE 150a–n. Step 504 is followed by step 506, in which the learned parameters including the expected event weighting factors are assigned initial values based on heuristic estimation, off-line evaluation of historical data, or by running historical data through the estimation system once the expected event processor 52 has been provisioned.

Step 506 is followed by step 508, in which the engine system 10 including the expected event processor 52 is run with real-time with data for successive time trials. Specifically, the engine system 10 forecasts and updates the learned parameters, including the weighting factors for the expected events, as it provides real-time monitoring and forecasting of the performance of the host computer system while taking the expected events into consideration. The engine system 10 also displays the system results and alarm status in the user interface 22, such as the dashboard user interface 34 described in U.S. application Ser. No. 09/811,163. The engine system 10 also operates the alarm service 40 as described in U.S. application Ser. No. 10/324,641.

More specifically, as described in U.S. Pat. Nos. 5,835, 902; 6,216,119; and 6,289,330, and with reference to FIG. 1, step 508 typically includes step 510, in which the engine system 10 receives measured input data 12, such as computer performance data for a time trial, which may be manipulated by the input transducer 16. Step 510 is followed by step 512, in which the engine system 10 estimates the computer system performance with imputed learned parameters, including imputed learned parameters associated with the weighting factors for the expected events, for the current time trial. Step 512 is followed by step 514, in which the engine system 10 estimates the computer system performance with forecasted learned parameters, including forecasted learned parameters associated with the weighting factors for the expected events, for future time trials. Step 514 is followed by step 516, in which the learned parameters are updated to reflect learning from the data received during the current time trial. Routine 500 then loops through steps 510 through 516 for each successive time trial as long as the engine system 10 continues to run for real-time data.

Figure 6:
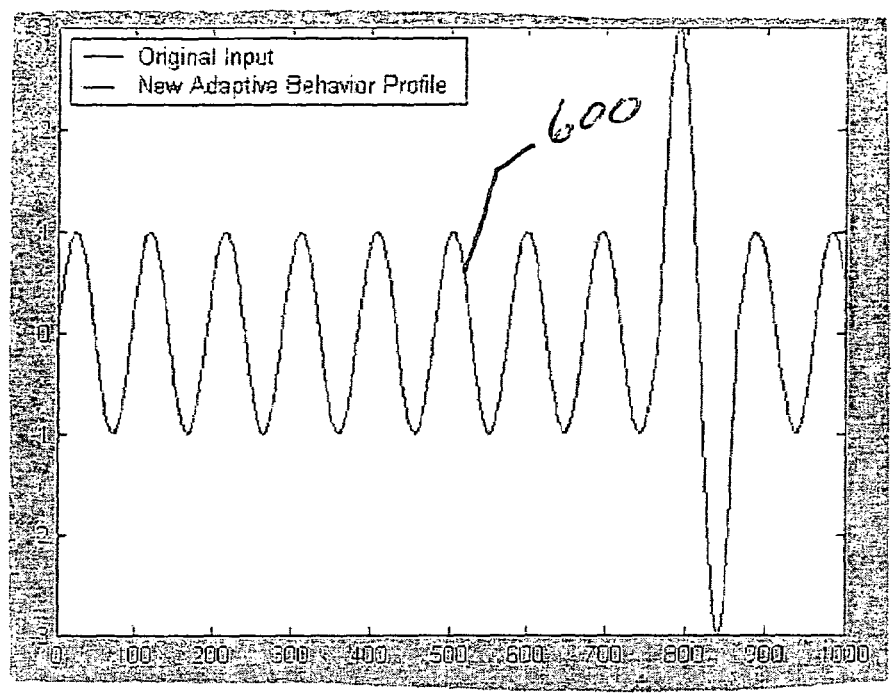
FIG. 6 is a graph illustrating computer performance with an expected event superimposed on the normal system behavior.
Figure 7:
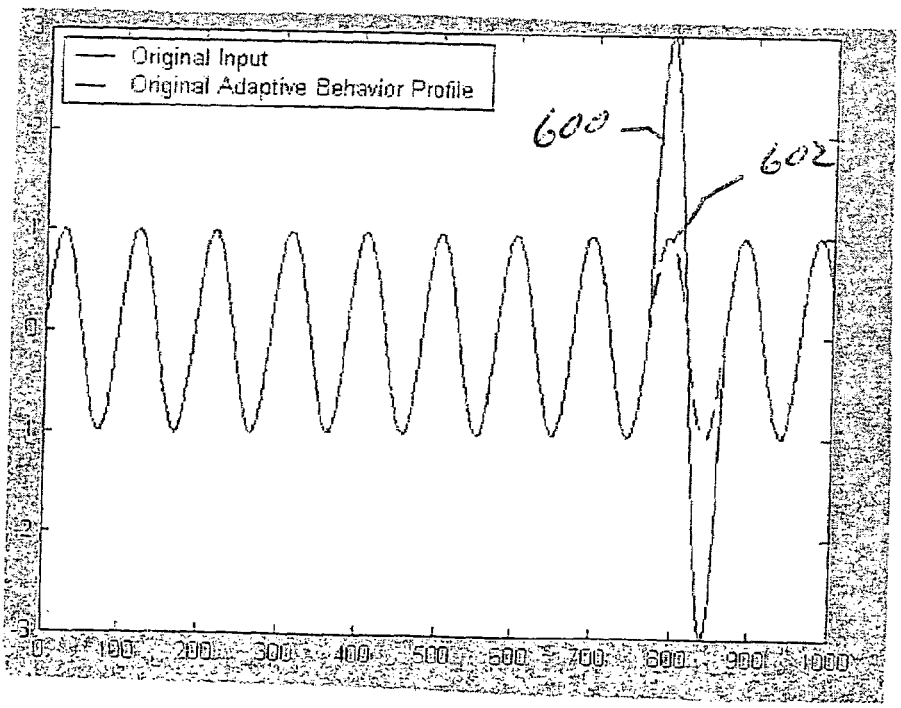
FIG. 7 is a graph illustrating the normal system behavior within the combined profile of FIG. 6.
Figure 8:
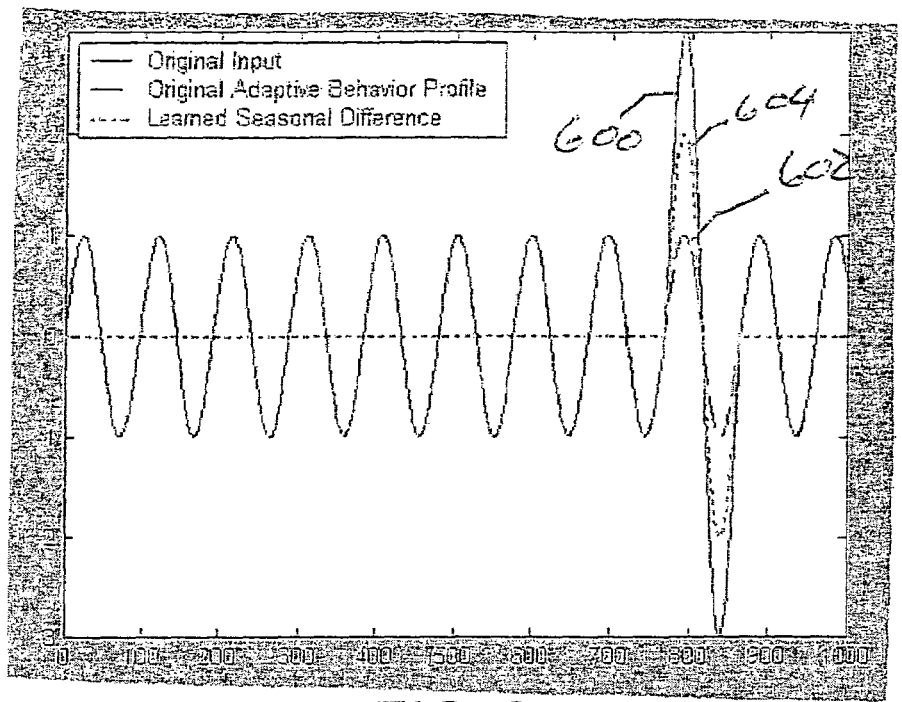
FIG. 8 is the graph of FIG. 6 illustrating the normal system behavior and the additional profile associated with the expected event.
Figure 9:
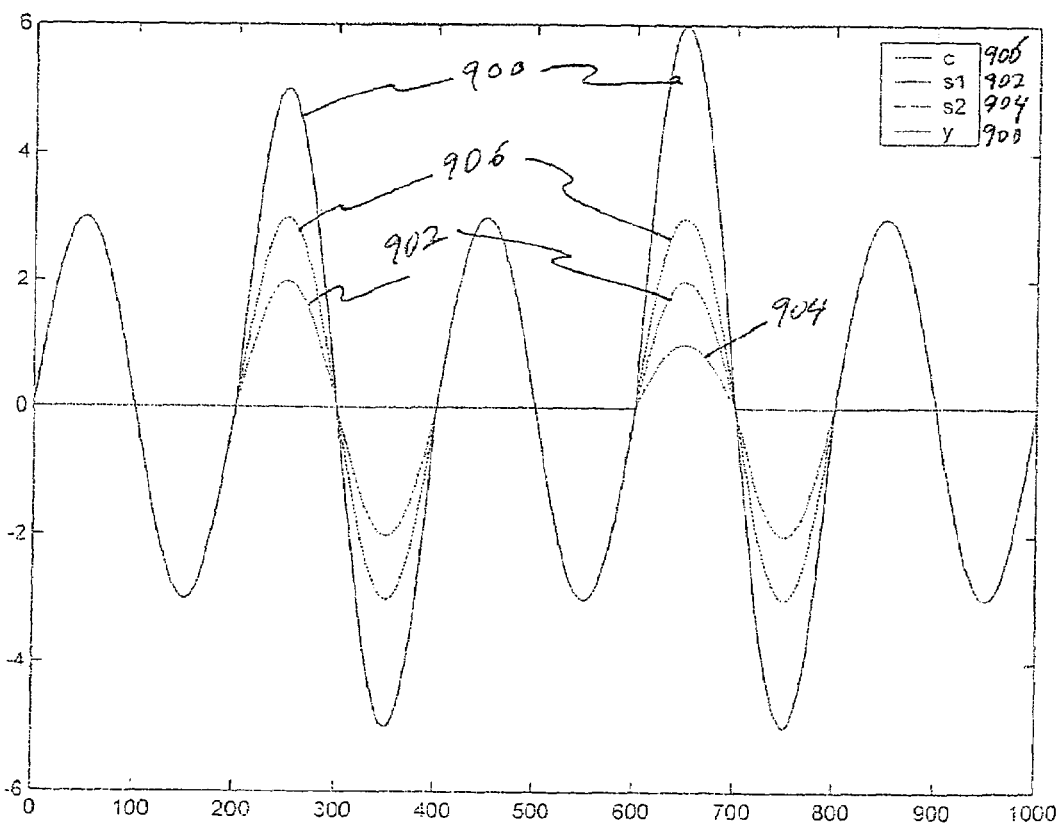
FIG. 9 is a graph illustrating computer performance with two expected events superimposed on the normal system behavior.

FIG. 6 is a graph showing a simplified representation of an illustrative computer performance 600 with an expected event superimposed on the normal system behavior. FIG. 7 is is a modified version of the graph shown in FIG. 6 showing the normal system behavior 602 within the computer performance 600. FIG. 8 is a modified version of the graph shown in FIG. 7 illustrating the normal system behavior 602 and the additional profile associated with the expected event 604 within the computer performance 600. It should be appreciated that the profile associated with the expected event 604 is zero except during those time trials when the expected event is active. FIG. 9 is a modified version of the graph shown in FIG. 6 showing a different illustrative computer performance 900 with two expected events 902 and 904 superimposed on the normal system behavior 906. Expected event 902 occurs twice during the illustrated cycle while expected event 904 occurs once and is not zero only during half a period of the normal system behavior 906. It should be appreciated that the expected event processor 52 described above augments the engine system 10 to independently estimate (i.e., impute for the current time trial and forecast for future time trials), and learn the behavior of (i.e., update the learned parameters for), the normal system behavior 906 as well as multiple expected events represented by the expected events 902 and 904 that overlap in time.

It should also be understood that the expected event scheduler 50 and processor 52 may be invoked locally or remotely, and may obtain its data locally or remotely, from one source or from several sources, and may report its output results locally or remotely, for example to a third party human or computer application. In addition, a remote invocation of the scheduled and seasonal component functions may be programmatic or via a human user interface, for example via a web browser interface or a graphical user interface. The output reporting method may also be programmatic or human readable, for example via text, web browser based or graphical reporting interface.

It should also be appreciated that a single expected event scheduler 50 and processor 52 may be used to provide analytical and reporting services for a number of engine systems, for example on a fee-for-service basis. That is, a number of engine systems deployed in distributed systems may periodically contact a single remotely-located expected event scheduler 50 and processor 52 to obtain estimation services that take the expected events into consideration. In particular, scheduled maintenance to periodically perform these operations may be scheduled to occur automatically and during convenient times, such as at night or on weekends. In addition, thin client applications, such as a browser or a browser enhanced by a JAVA download, may be used to access and control a remote scheduled and seasonal component processor and receive its reported results over a network, such as the Internet, for real-time engine system analysis. Access to this type of expected event scheduler 50 and processor 52 may be provided as a fee-for-service basis during regular business working hours. In this manner, a single expected event scheduler 50 and processor 52 may support a large number of operating engine systems, providing both scheduled maintenance and real-time engine support. Many other computer architectures and business models for deploying the expected event scheduler 50 and processor 52 will become apparent to those skilled in the art, and fall within the spirit and scope of the present invention.

In view of the foregoing, it will be appreciated that present invention provides an effective, useful and understandable system for configuring computerized estimation systems to take expected events into consideration. It should be understood that the foregoing relates only to the exemplary embodiments of the present invention, and that numerous changes may be made therein without departing from the spirit and scope of the invention as defined by the following claims.

The invention claimed is:

1. In or for an estimation system for a host system operable for receiving input values for successive time trials, computing output values based on the input values and learned parameters, and updating the learned parameters to reflect relationships observed among the input and output values, a method comprising the steps of:
   identifying multiple expected events that overlap in time;
   provisioning the estimation system with learned parameters for the expected events including weighting factors for the overlapping expected events;
   initializing the learned parameters for the expected events; and
   running the estimation system to forecast operation of the host system as effected by the expected events while updating the learned parameters including the learned parameters for the expected events.

2. The method of claim 1, wherein the step of running the estimation system comprises the steps of:
   (a) receiving measured data corresponding to operation of the host system for a current time trial;
   (b) estimating operation of the host system for the current time trial using imputed learned parameters;
   (c) predicting operation of the host system for future time trial using forecasted learned parameters;
   (d) updating the learned parameters based on the measured data received for the current time trial; and
   repeating the steps (a) through (d) for a number of successive time trials.

3. The method of claim 1, wherein the expected events comprise scheduled events.

4. The method of claim 1, wherein the expected events comprise seasonal events.

5. The method of claim 1, wherein the expected events comprise scheduled and seasonal events.

6. The method of claim 1, wherein expected events overlap in time.

7. The method of claim 6, wherein the host system is a computer system and the estimation system forecasts the performance of the computer system.

8. The method of claim 7, wherein the host system comprises a computer system comprises a computer network including application servers, storage servers, routers, and interconnecting data transmission lines.

9. The method of claim 8, wherein the expected events include end-of-month processing events and end-of-quarter processing events.

10. The method of claim 8, wherein the expected events include weekends and holidays.

11. The method of claim 8, wherein the expected events include scheduled backup events.

12. The method of claim 8, wherein the measured data comprises data received from one or more monitoring agents deployed within the computer system.

13. The method of claim 8, wherein the measured data comprises data received from one or more sources external to the computer system.

14. The method of claim 8, wherein the measured data comprises data received from one or more monitoring agents deployed within the computer system and data received from one or more sources external to the computer system.

15. A computer-based estimation system configured to perform the steps recited in claim 1.

16. A computer storage medium storing executable instruction for causing a computer system to implement the method recited in claim 1.

17. In or for an computer performance estimation system operable for receiving input values for successive time trials, computing output values based on the input values and learned parameters, and updating the learned parameters to reflect relationships observed among the input and output values, a method comprising the steps of:
   identifying multiple expected events including scheduled events that overlap in time;
   provisioning the estimation system with learned parameters for the expected events including weighting factors for the overlapping expected events;
   initializing the learned parameters for the expected events; and running the estimation system to forecast performance of the computer system as effected by the scheduled events while updating the learned parameters including the learned parameters for the scheduled events.

18. The method of claim 17, wherein the step of running the computer performance estimation system comprises the steps of:
(a) receiving measured data from corresponding to operation of the computer system for a current time trial, the measured data including date received from one or more monitoring agents deployed within the computer system;
(b) estimating operation of the computer system for the current time trial using imputed learned parameters;
(c) predicting operation of the computer system for future time trial using forecasted learned parameters;
(d) updating the learned parameters based on the measured data received for the current time trial; and
repeating the steps (a) through (d) for a number of successive time trials.

19. The method of claim 17, wherein:
the expected events further seasonal events including weekends and holidays.

20. The method of claim 19, wherein the host system comprises a computer system comprises a computer network including application servers, storage servers, routers, and interconnecting data transmission lines.

21. The method of claim 20, wherein the expected events further include end-of-month processing events and end-of-quarter processing events.

22. A computer-based estimation system configured to perform the method recited in claim 17.

23. In or for an computer performance estimation system operable for receiving input values for successive time trials, computing output values based on the input values and learned parameters, and updating the learned parameters to reflect relationships observed among the input and output values, a method comprising the steps of:
identifying multiple expected events that overlap in time including scheduled events;
provisioning the estimation system with learned parameters for the expected events including weighting factors for the overlapping expected events;
initializing the learned parameters for the expected events;
running the estimation system to forecast performance of the computer system as effected by the scheduled events while updating the learned parameters including the learned parameters for the scheduled events; and
wherein the step of running the computer performance estimation system comprises the steps of (a) receiving measured data from corresponding to operation of the computer system for a current time trial, the measured data including date received from one or more monitoring agents deployed within the computer system; (b) estimating operation of the computer system for the current time trial using imputed learned parameters; (c) predicting operation of the computer system for future time trial using forecasted learned parameters; (d) updating the learned parameters based on the measured data received for the current time trial; and repeating the steps (a) through (d) for a number of successive time trials.

24. The method of claim 23, wherein the expected events further seasonal events including weekends and holidays.

25. The method of claim 23, wherein the host system comprises a computer system comprises a computer network including application servers, storage servers, routers, and interconnecting data transmission lines.

26. The method of claim 23, wherein the expected events further include end-of-month processing events and end-of-quarter processing events.

27. A computer storage medium storing executable instruction for causing a computer system to implement the method recited in claim 23.

28. A computer-based estimation system configured to perform the method recited in claim 17.

29. A computer storage medium storing executable instruction for causing a computer system to implement the method recited in claim 23.

* * * * *